Sept. 5, 1950  A. THURAS  2,521,136
HYDROPHONE
Filed April 28, 1949  2 Sheets-Sheet 1
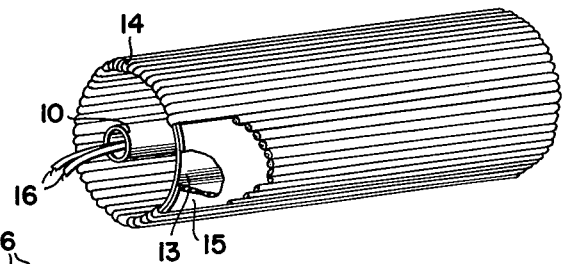
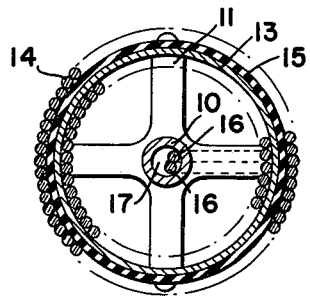
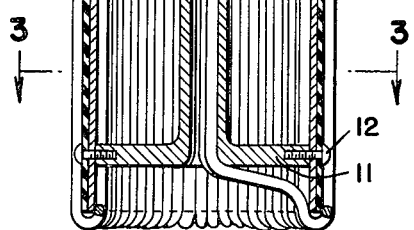
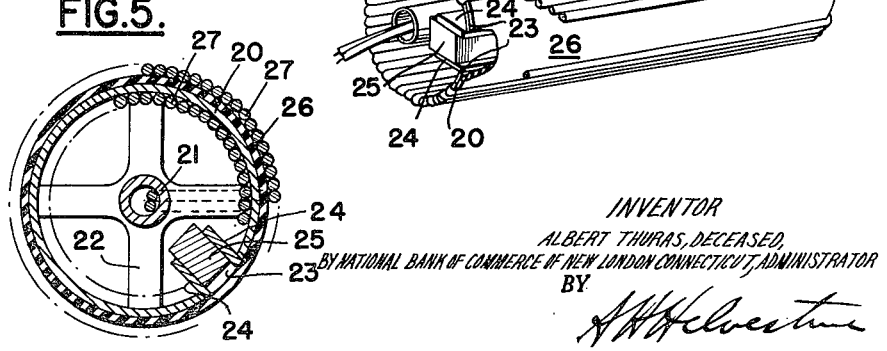
INVENTOR
ALBERT THURAS, DECEASED,
BY NATIONAL BANK OF COMMERCE OF NEW LONDON CONNECTICUT, ADMINISTRATOR
BY
Attorney Sept. 5, 1950  A. THURAS  2,521,136
HYDROPHONE
Filed April 28, 1949  2 Sheets-Sheet 2
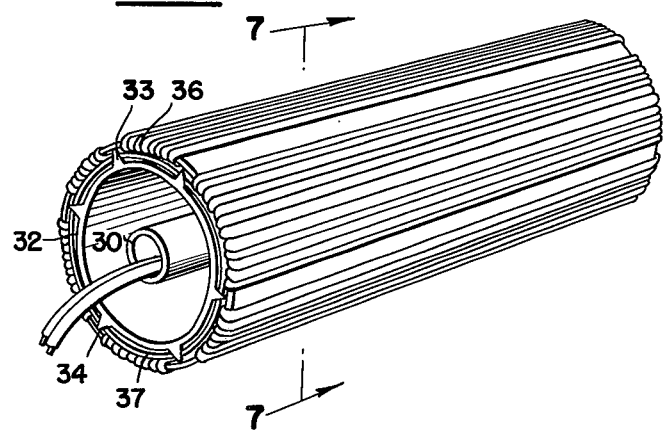
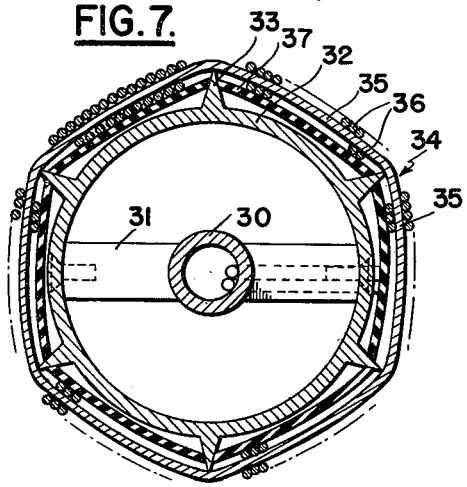
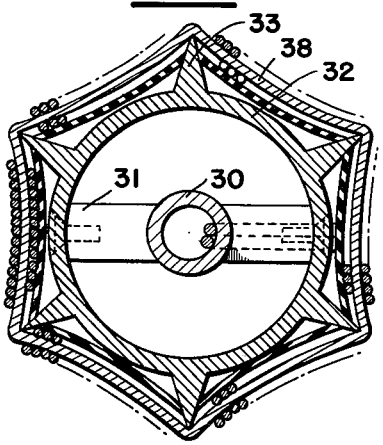
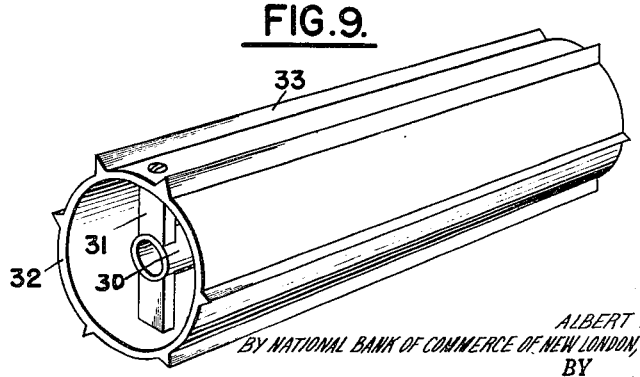
INVENTOR
ALBERT THURAS, DECEASED,
BY NATIONAL BANK OF COMMERCE OF NEW LONDON, CONNECTICUT, ADMINISTRATOR
BY
Attorney Patented Sept. 5, 1950

2,521,136

UNITED STATES PATENT OFFICE 2,521,136

HYDROPHONE

Albert Thuras, deceased, late of New London, Conn., by National Bank of Commerce, administrator, New London, Conn., assignor to the United States of America Application April 28, 1949, Serial No. 90,248

2 Claims. (Cl. 177—386)

The present invention relates to a device for generating or receiving sound signals at sonic or ultrasonic frequencies, and more particularly to an underwater transducer of the tubular magnetostrictive type having a toroidal-wound coil for converting compressional wave energy into electrical energy or vice versa.

The transducer includes a magnetostrictive tube supporting a toroidal-wound coil and subjected to a magnetic field alternating at various frequencies reaching into the ultrasonic region. The tube expands and contracts radially along the direction of the magnetic lines of force at the frequency of the alternating magnetic field.

The magnetostrictive transducer is reversible and can be used to receive an acoustic signal in response to the pressure of an alternating compressional wave as well as to radiate acoustic energy under an electric driving force.

The physical radial expansion and contraction of the tube forms the source of compressional wave energy and when the tube is under water, this energy is propagated through the water medium as an acoustic signal receivable by a suitable receiving device.

When used as a receiver, a compressional wave of energy striking the magnetostrictive tube causes it to alternately expand and contract. As the tube is polarized by a magnetic field, this tube expansion and contraction causes the flux linkages between this field and the coil to induce an electromotive force in the coil which is fed to a suitable detecting means.

An object of the invention is to provide a transducer that is of light construction but yet sufficiently rugged to withstand the use to which it is put.

Another object is to provide a transducer that is simple to construct and has a sufficiently low cost of manufacture that it may be made expendable or discarded after use of a few hours.

Other objects and many of the attendant advantages of this invention will be readily appreciated as the same becomes better understood by reference to the following detailed description when considered in connection with the accompanying drawings in which like reference numerals refer to like parts throughout the figures and wherein:

Figure 1 is a perspective view of one form of the transducer with certain parts broken away to show constructual details;

Figure 2 is a central longitudinal cross sectional view of the transducer of Figure 1;

Figure 3 is a cross sectional view taken through 3—3 of Figure 2;

Figure 4 is a perspective view of a modification of the transducer of Figure 1 with certain parts broken away to show the construction;

Figure 5 is a transverse cross section taken in a plane normal to the longitudinal axis of Figure 4;

Figure 6 is a perspective view of an additional form of a transducer;

Figure 7 is a transverse sectional view of the transducer of Figure 6 taken on plane normal to its axis and substantially along line 7—7 of Figure 6;

Figure 8 is a view similar to Figure 7 of a modification of the transducer of Figure 7; and Figure 9 is a perspective view of the stiffening frame employed with the transducer of either of Figures 6 and 8.

Referring to the modification of Figures 1, 2, and 3, a supporting stem 10 is provided with cross arms 11 to which is secured by any suitable means, such as the screws 12, a cylindrical tube 13 formed from suitable magnetostrictive material.

A plurality of coils of wire 14 are wrapped around the tube 13 in the form of a toroid. Each coil is wound about the wall of the tube 13 and extends substantially parallel to the axis of the tube. Thus, each coil lies both inside and outside of its portion of the tube wall.

Since the axial length of the magnetostrictive tube 13 is small relative to the wave length of sound in the transmitting medium, it is necessary to prevent the cancellation of sound pressure on the outer surface of the wall by the sound pressure entering the open ends of the tube and acting on the inner surface of the same wall. By inserting a pressure-relieving layer 15 of suitable resilient material, such as air-cell rubber, on one periphery or surface of the tube wall between it and one side of the coils 14, sound cancellation is minimized.

This rubber layer 15 may be interposed between the inner periphery or wall of the tube 13 and the windings, or between the outer surface or wall and the windings, as shown in the drawings, without affecting the operation of the transducer.

The wire coils 14 terminate in a pair of leads 16 which are passed through an axial bore 17 of the stem 10 and are adapted to be connected either to a suitable source of alternating energy, or to any suitable detecting apparatus such as shown in Patent No. 2,005,741, issued on June 25, 1935, to H. C. Hayes for a Magnetostrictive Sound Generator.

The transducer as illustrated can be suspended directly into the water where it can be used either to project or to detect sounds. No protection is provided for the transducer against the deteriorating action of the water for this type of transducer is intended to be expendable and need only withstand such action for a few hours.

However, the transducer can be provided with the necessary protection by merely enclosing it in any suitable container.

The tube 13 is formed from magnetostrictive material that may be either annealed nickel or some substance having high magnetic retentivity, such as a composition of 49% Fe, 49% Co and 2% V, commercially known as Permendur. If nickel is used, a polarizing current is applied to the winding to provide the necessary magnetic flux. If Permendur is used, the material can be magnetized on assembly and the polarizing current eliminated.

For efficiency and high output, the radius of the underwater transducer approximates the wave length of sound in water and is such that the water impedance looking out from the transducer throughout its frequency range will appear as a negative stiffness reactance. This apparent negative stiffness reactance can be balanced out by the positive stiffness reactance of the transducer resulting in a more or less pure resistance load. This produces a wider frequency response band than heretofore possible. A transducer of such suitable dimensions is approximately 5" long and 3" in diameter with a wall thickness of .35".

The modification of Figure 4 employs a separate permanent magnet as a souce of magnetic flux or polarizing field for the magnetostrictive tube.

The tube 20 is also a suitable magnetostrictive material, such as annealed nickel, and is mounted on a stem support 21 and arms 22 similarly to the tube 13. The tube 20 is provided with a longitudinal slot 23 fitted with soft iron pole pieces 24 within which is inserted a permanent magnet 25 to supply the necessary polarizing magnetic flux.

As in the previous embodiment, a pressure-relieving layer 26 is inserted between the tube 20 and the coil windings 27.

The resonant frequency of a hydrophone is inversely proportional to its radius of curvature and to improve its efficiency, particularly at frequencies below its resonant frequency, the devices of the previous figures may be modified as taught by Figures 6, 7, 8 and 9 wherein the hollow core 30 is provided with cross arms 31 to which is secured a stiffening frame 32 having a number of wedge-shaped ribs 33 running lengthwise of the frame 32 and circumferentially spaced about it.

Supported by the apices of the ribs 33 is tube 34 of magnetostrictive material. The overall diameter at the apices is slightly greater than that of the cylindrical tube 34 into which the frame 32 may be forced causing the tube 34 to assume the slightly polygonal shape clearly shown in Figure 7.

As shown in this figure the tube is substantially hexagonal but with curved sides or panels 35 about which are wound the coils 36 into a substantially toroidal winding, with the turns or coils being separated adjacent the wedge-shaped ribs to clear the same. The coils are connected in series or parallel as in the previous embodiments.

A panel 37 of pressure-relieving material is inserted between each pair of ribs 33 and due to its inherent resiliency may be made to bow radially and outwardly away from the walls of the frame 32 and into contact with the inner portions of the windings or coils 36. The pressure-relieving material is similar to 15 of Figure 3 and functions in the same manner for the same purpose.

Although the tube 34 may be forced into its polygonal shape by the frame, it may be preformed and slipped over the frame ribs with a force fit.

The efficiencies of two tubular hydrophones can be compared below the resonant frequency of the larger if all other conditions are the same, by a consideration of their radii: the ratios of the efficiencies being expressed by the term $(r_1/r_2)^3$. However, in comparing the polygonal hydrophone with a tubular hydrophone, having the same circumference, the ratio of efficiencies is expressed by the term $(r_1/r_2)^4$, where $r_1$ is the radius of curvature of a panel of the polygonal hydrophone and $r_2$ is the radius of the tubular hydrophone.

The increase in efficiency in both cases is due to the decreased stiffness of the hydrophone having the larger radius and the resultant greater internal strain in the magnetostrictive material for the same external pressure. Since the magnetic flux variation and the voltage generated thereby in the winding are directly proportional to the strain, the hydrophone having the lower stiffness will be the more efficient. In the case of two tubular hydrophones, the length of the flux path is greater in the larger hydrophone; hence the inductance is greater. In the case of the polygonal hydrophone, the length of the flux path, and hence the inductance, is the same as in the tubular hydrophone. This is the reason that the efficiency ratio is the fourth power of the radii rather than the third.

For use in water of great depth where it is feared that the device of Figures 6 and 7 might be crushed by the pressure, panels 35 may be formed concave as in Figure 8 and therefore in tension, when subjected to pressure, rather than in compression as is the case with the other, and the tendency to crushing is lessened. All other details are similar to those of the device previously described.

It should be understood, of course, that although the foregoing disclosure relates to preferred embodiments of the invention, numerous modifications or alterations may be made therein without departing from the spirit and the scope of the invention as set forth in the appended claims.

Having thus described the invention, what is claimed is:

1. In a transducer, the combination of an inner tube, a plurality of parallel, longitudinally-extending wedge-shaped ribs circumferentially spaced on said inner tube, a hollow magnetostrictive tube supported by said ribs, said magnetostrictive tube being of polygonal cross section, and constituting a wall with opposed peripheries, a plurality of windings wound into a substantially toroidal coil around said wall lengthwise of and substantially parallel to the axis of the same, each said winding contacting both peripheries of said wall and a pressure-relieving layer between and supported by adjacent pairs of ribs, said layer being in contact with one side of said windings, said windings being wholly and completely supported by said tube and arranged to give an additive magnetic effect.

2. In a transducer, the combination of an inner tube, a plurality of parallel, longitudinally-extending wedge-shaped ribs circumferentially spaced on said inner tube, a hollow magnetostrictive tube supported by said ribs, said magnetostrictive tube having a substantially polygonal cross section and curved side wall portions, a plurality of windings wound into a substantially toroidal coil around said wall portions lengthwise of and substantially parallel to the axis of the tubes, each said winding contacting both sides of its respective wall portion and pressure-relieving material on said inner tube and in contact with one side of said windings, said windings being wholly and completely supported by said magnetostrictive tube and arranged to give an additive magnetic effect.

NATIONAL BANK OF COMMERCE
NEW LONDON, CONNECTICUT,
By ELSIE M. FLETCHER,
Asst. Trust Offier,
Administrator of Estate of Albert L. Thuras, Deceased.

REFERENCES CITED

The following references are of record in the file of this patent:

UNITED STATES PATENTS

| Number | Name | Date |
|---|---|---|
| 2,005,741 | Hayes | June 25, 1935 |
| 2,076,330 | Wood | Apr. 6, 1937 |
| 2,398,117 | Rose et al. | Apr. 9, 1946 |
| 2,438,926 | Mott | Apr. 6, 1948 |

FOREIGN PATENTS

| Number | Country | Date |
|---|---|---|
| 607,048 | Germany | June 29, 1935 |